Oct. 2, 1923.
C. GILLIG ET AL
VEHICLE TOP
Filed Nov. 28, 1919
1,469,331
2 Sheets-Sheet 1
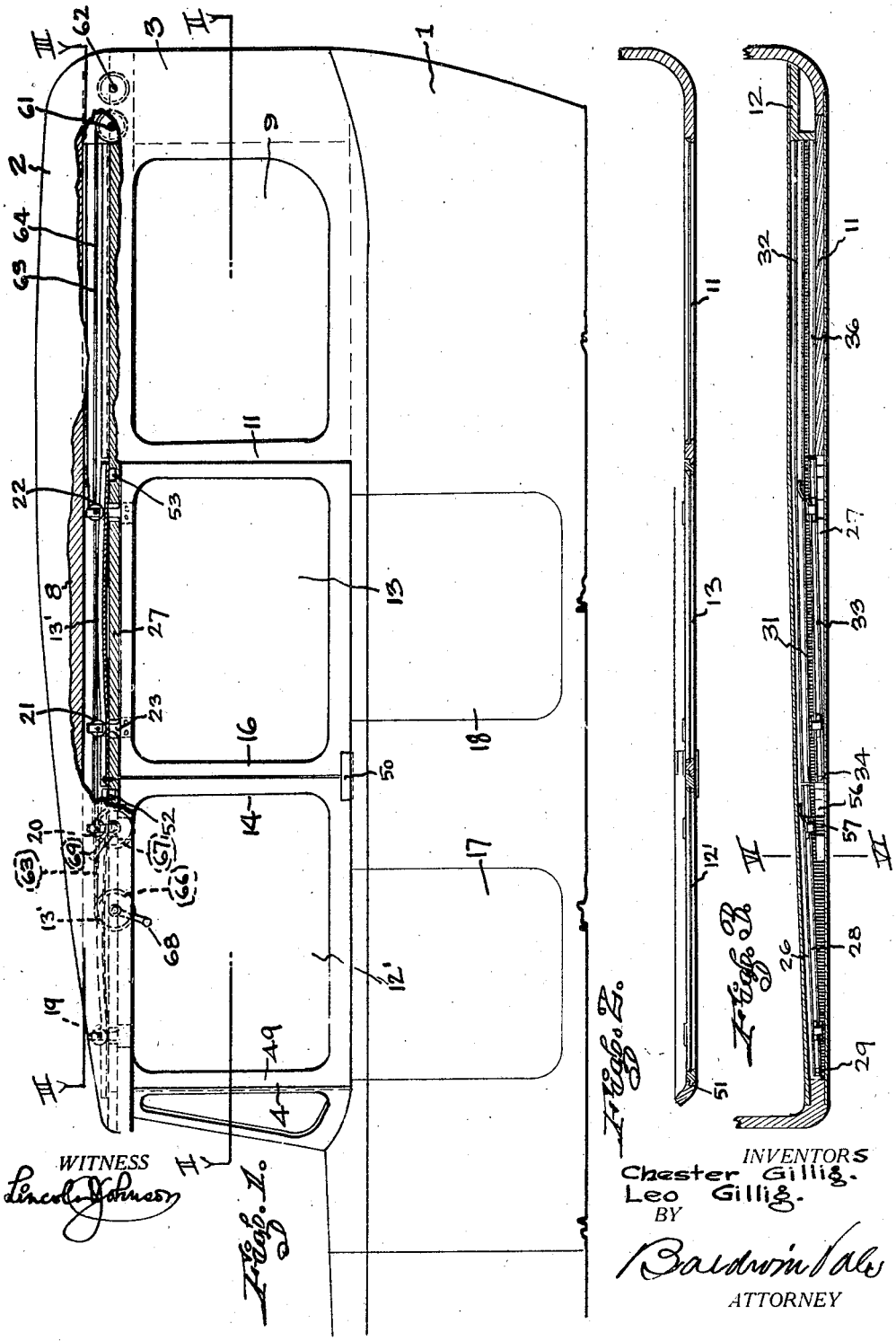
WITNESS
Lincoln Johnson
INVENTORS
Chester Gillig.
Leo Gillig.
BY
Baldwin Vale
ATTORNEY Oct. 2, 1923.   1,469,331
C. GILLIG ET AL
VEHICLE TOP
Filed Nov. 28, 1919    2 Sheets-Sheet 2
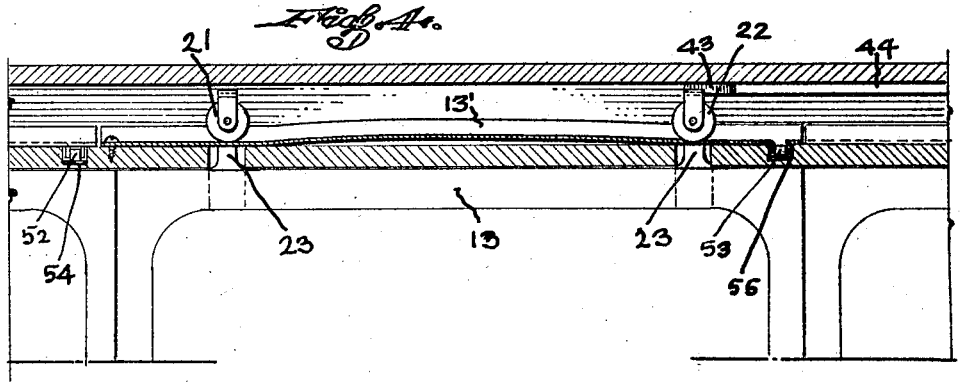
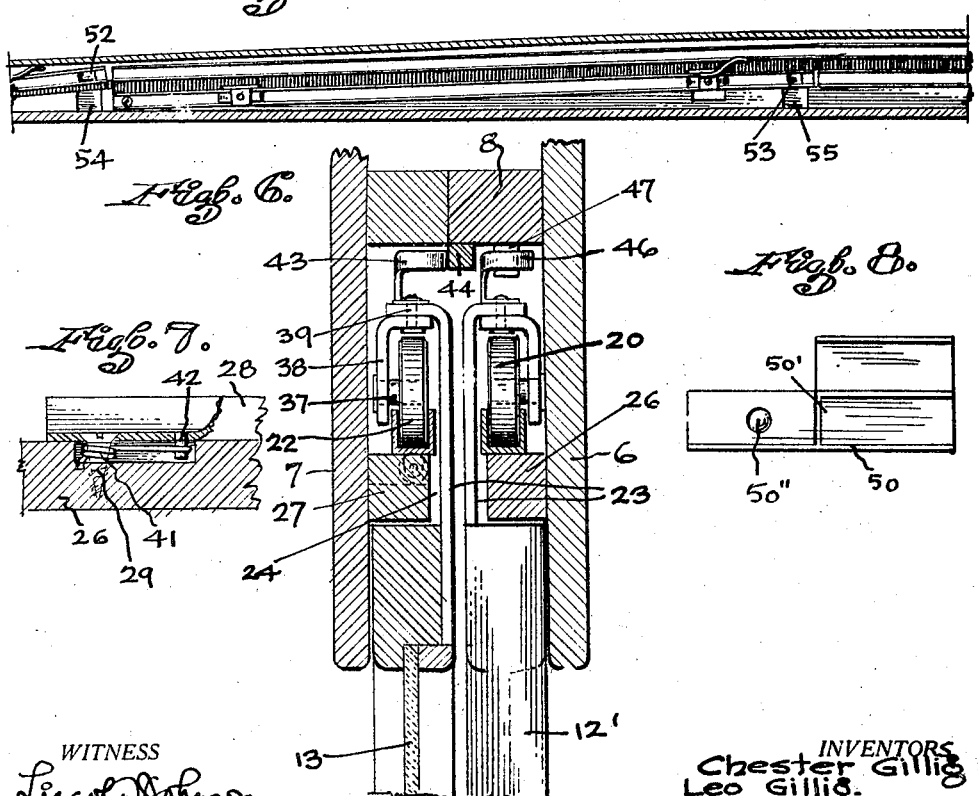
WITNESS
INVENTORS
Chester Gillig
Leo Gillig.
BY
ATTORNEY Patented Oct. 2, 1923.

1,469,331

UNITED STATES PATENT OFFICE.

CHESTER GILLIG AND LEO GILLIG, OF SAN FRANCISCO, CALIFORNIA.

VEHICLE TOP.

Application filed November 28, 1919. Serial No. 341,149.

*To all whom it may concern:*

Be it known that we, CHESTER GILLIG and LEO GILLIG, both citizens of the United States, and residents of the city and county of San Francisco, State of California, have made a new and useful invention—to wit, Improvements in Vehicle Tops; and we do hereby declare the following to be a full, clear, concise, and exact description of the same.

This invention relates particularly to convertible tops for automobiles.

Among the objects of the invention are to produce a convertible top for automobiles having sliding side panels adapted to be stored in superposed relation in the inoperative position and adapted when in the operative position, to present a flush plane, with the edges of the sashes in abutted relation. Another object is to provide automatic tension means for restoring the sashes to the inoperative position when released from the operative position. Other objects and advantages will appear as this description progresses.

In this specification and the annexed drawings the invention is illustrated in the form considered to be the best, but it is to be understood that the invention is not limited to such form, because it may be embodied in other forms; and it is also to be understood that in and by the claims following the description it is desired to cover the invention in whatsoever form it may be embodied.

Convertible tops such as herein disclosed represent an intermediary type between the "enclosed car" having vertically sliding glazed window sashes; and the "cape top" type having attachable and detachable side curtains with celluloid or other flexible transparent inserts.

In the accompanying two sheets of drawings,

Fig. 1 is a side elevation of a convertible top, constructed in accordance with this invention, attached to an automobile body diagrammatically illustrated.

Fig. 2 is a fragmentary detail in horizontal section taken on the line II—II Fig. 1, showing the sashes in the operative relation.

Fig. 3 is a similar view taken on the line III—III Fig. 1.

Fig. 4 is an enlarged detail in side elevation, with portions of the body in cross section, illustrating the relation of the roller support mechanism for the sashes.

Fig. 5 is a plan view from above of the same, in cross section taken on the line III—III Fig. 1.

Fig. 6 is a similar view of the same in cross section taken on the line VI—VI Fig. 3.

Fig. 7 is a fragmentary detail partially in section of the switch track tension means.

Fig. 8 is a detail plan view of the bottom sash stop.

In detail the construction illustrated in the drawings includes the conventional automobile body 1, having a permanently installed top 2 supported at the back by the enclosing structure 3 and at the front by the corner stanchion 4.

The lateral edges of the top are provided with the downwardly depending strips 6, parallel with the sides 7, to which they are attached by the spacing blocks 8, forming downwardly open channels or runways for the sash hangers. This runway extends from the stanchions 4 at the front, to the back support 3. The rear compartment of the auto body is enclosed at the sides with permanent glazed sashes 9, having their front rails or stanchions 11 extending up from the body and merging into the side strips 7. This rear portion is built out by the spacer 12, to the necessary lateral thickness, to provide storage for the front and intermediate sashes 12' and 13, the end rails 14 and 16 of which meet at a point intermediate the doors 17 and 18, about in line with the back of the front seat of the body. These sashes 11, 12' and 13 are glazed with a good quality of glass to give a clear vision therethru. The sashes 11, 12' and 13 are supported upon the rollers 19, 20, 21 and 22 respectively. The hangers 23 of these various rollers extend downward and are attached to their respective sashes, the hangers for the rollers 19 and 20 being fixed to the outside of the sash 12' and hangers for the rollers 21 and 22 being fixed to the inside of the sash 13. These hangers are adapted to pass within the slot 24 between the support rails 26 and 27 that are fixed to the strips 6 and 7 respectively, see Fig. 6.

To accomplish the flush plane relation the various sashes as indicated in Fig. 2, we provide the switch track 28 pivoted at 29 on the rail 26. The rear end of this track 28 registers in line with the intermediate track 31, fixed on the rail 26 and extending backward to form the storage track 32 also fixed on the rail 26, thus forming a continuous track for the support of the sash 12′, extending from the inoperative position behind the sash 11 to the forward operative position shown in Fig. 1.

We provide an intermediate switch track 33 pivoted at 34 on the rail 27 and extending rearward in alinement with the storage track 36 fixed on the rail 27 behind the sash 11. We prefer channel iron for these tracks with the rollers running between the side flanges thereof, as such a form of roller is less liable to derailment than a flanged roller, although we do not wish to be limited to the exact construction shown. These rollers rotate upon the pins 37 fixed in the side plates 38 that are pivoted at 39 to the hangers 23. The pivot mounting 39 permits the rollers to swivel in accommodating themselves to any curves or angles encountered in the track, in passing from one section to another.

The track 28 is held in normal alinement with the track section 31, and the track 33 is held in line with the storage section 36 by the action of the torsion springs 42 surrounding the pivots 29 and 34 and expanding to push against the pins 41 fixed in the tracks 28 and 33 see Fig. 7. This sort of spring is preferred because of its compactness, but other means may be employed for accomplishing the same function.

The hanger above the roller 20 is provided with the frictional wipe spring 43, engaging the chock 44 fixed on the block 8 above the slot 24. When the spring 43 engages the chock 44 it has a resilient cam action guiding the end of the sash 12′ laterally, overcoming the tension of the spring 41, and swinging the track 33 laterally, bringing the sash 13 so that the meeting rail 16 lines up flush with the meeting rail 14 of the sash 12′. A similar spring 46 on the sash 12′ engages the chock 47, also fixed on the block 8, and operates similarly, to force the sash rail 12′ into alinement with the sash rail 13 of the intermediate sash. This action forces all of the sashes 12′ and 13 into flush longitudinal alinement with the stationary sash 9 as shown in Fig. 2. The front rail 49 may be rabbeted as at 51, and the meeting rails 14 and 16 and 11 may be similarly formed for excluding wind and inclemencies of the weather.

The bottom stop 50 is fixed on the top edge of the automobile body, its channel form engaging the sashes 12′ and 13 at their meeting rails 14 and 16, to prevent the inward swinging of these sashes while in the operative position. The sash 13 stops against the partition 50′ while the sash 12′ stops against the depressible spring button 50″ in the bottom of the stop 50.

The end of the track sections 28 and 33 are provided in the ends opposite to their pivot with the antifriction rollers 52 and 53 respectively, rolling upon metal plates 54 and 55 fixed on the rail 26. As the rail 28 has to pass the slot 24 in adjusting the front sash 12′ in the position shown in Fig. 2, we build out the block 56 on the side strip 6 to reduce the width of the slot 24 at that point, since only the thickness of one hanger 23 has to pass therethru. This block 56 is notched as at 57 to receive the hanger 23 of the roller 20. The track 28 being wider than the slot at 24 it passes across without dropping therein.

For the purposes of excluding the weather it is desirable that the sashes 12′ and 13 rest upon the top edge of the auto body 1; yet it is undesirable that they slide thereon. To lift the sashes during their passage into position we bow the tracks 28 and 33 upward, as shown in Fig. 4, the bow apex being indicated at 13′ as the front rollers 19 and 21 pass up the incline to the apex the front edge of their respective sashes are elevated above the level of the top rail of the auto body and do not contact therewith until the sashes are in the full operative position.

To automatically return the sashes 12′ and 13 to the storage position behind the sash 11, we provide the tension reels 61 and 62 mounted on journals fixed in the top 2 and having tension springs coiled therein and provided with external sheave grooves to receive the metal ribbons 63 and 64, the former being connected to the sash 12′ and the latter to the sash 13, so that when the sashes are pulled inward out of operative position the tension of the reels 61 and 62 will pull them backward into the storage position.

To facilitate control of the sashes 12′ and 13 from the driver's seat we provide the manual controls comprising the windlasses 66 and 67 journaled between the strips 6 and 7, and provided with the crank handles 68 and 69 respectively. The ribbon 63 is wound upon the windlass 66 and the ribbon 64 upon the windlass 67.

By this invention an open car can be immediately converted into a closed car and reconverted into an open car with the minimum amount of effort on the part of the operator.

The invention operates substantially as follows: When it is desired to close the body of the car, the crank handle 68 is rotated by the operator which slides the front sash forward from the storage track 32 across the intermediate track section 31, onto the pivoted track section 28, held in normal alinement by the torsion spring 41. The spring 46 on the said sash meeting the chock 47 forces said sash into the flush position, shown in Fig. 2 where it remains, being held by the notch 57 engaging the hanger of the roller 20 and against lateral displacement by the stop 50''. The crank handle 69 is then rotated to slide the sash 13 forward from the storage track 36 onto the pivoted track 33, until the spring 43 engages the chock 44 which forces the rear rail of the sash into position, in engagement with the front rail 11 of the rear sash where it is held laterally by the stop 50. To open the car the procedure is reversed. The meeting rail 14 is pulled laterally against the tension of the spring 46 until the track 28 alines with the intermediate section 31 when the tension of the reel 61 will slide it back into storage position. The center sash 13, is restored by disengaging the rail 48 from the rail 11, against the tension of the spring 43 until the track 33 alines with the track 36, then the tension of the reel 62 will pull the sash 13 into the storage position.

The construction and installation of this invention will vary somewhat from that disclosed in meeting variable conditions of the various types of automobile bodies. Swivelling the hangers as at 39 permits them to accommodate themselves to a considerable lateral bow or curve of the sides of the top or the body. It is the general practice however to make the sides of the top substantially in straight lines from the wind shield or stanchion 4 of the front, to the rear door at the sash rail 11. In some models practically a straight line exists between the stanchion 4 and the back of the rear seat at 3.

Having thus described our invention what we claim and desire to secure by Letters Patent is:—

1. A convertible top such as described having a runway therein; a fixed sash in said top; a storage track in said runway parallel with said sash; a track pivoted substantially in alinement with said sash and adapted to swing into register with said storage track; and a sliding sash supported on said tracks; and means for normally holding said pivoted track in register with said storage track; means on said sliding sash and said runway for automatically guiding said sliding sash into flush alinement with said fixed sash in the operative position, and means on said top engaging said sash at the top and bottom edges for holding said sliding sash in the flush position.

2. A convertible top such as described having a runway therein; a fixed sash in said top; a plurality of storage tracks in said runway parallel with said sash; a plurality of switch tracks pivoted substantially in alinement with said fixed sash and adapted to register with said storage tracks; a plurality of sliding sashes respectively supported on said tracks; means on said sliding sashes and said runway for automatically guiding said sliding sashes into flush alinement with said fixed sash in the operative position and means on said top engaging said sash at the top and bottom edges for holding said sash in the flush position.

3. A convertible top such as described having a runway therein; a fixed sash in said top; a plurality of storage tracks in said runway parallel with said sash; a plurality of vertically bowed switch tracks pivoted substantially in alinement with said fixed sash and adapted to register with said storage tracks said bowed switch tracks being adapted to elevate the sliding sash when moved forwardly or rearwardly; a plurality of sliding sashes respectively supported on said tracks; means on said sliding sashes and said runway for automatically guiding said sliding sashes into flush alinement with said fixed sash in the operative position and means on said top engaging said sash at the top and bottom edges for holding said sash in the flush position.

4. A convertible top such as described having a runway therein; a fixed sash in said top; a plurality of storage tracks in said runway parallel with said sash; a plurality of vertically bowed switch tracks pivoted substantially in alinement with said fixed sash and adapted to register with said storage tracks, said bowed switch tracks being adapted to elevate the sliding sash when moved forwardly or rearwardly; vertically pivoted hangers engaging said tracks; a plurality of sliding sashes supported on said hangers, means on said sliding sashes and said runway for automatically guiding said sliding sashes into flush alinement with said fixed sash, in the operative position and means on said top engaging said sash at the top and bottom edges for holding said sash in the flush position.

5. A convertible top having a runway therein; a fixed sash in said top; a plurality of storage tracks in said runway parallel with said sash; a plurality of vertically bowed switch tracks pivoted substantially in alignment with said fixed sash and adapted to register with said storage tracks, said bowed switch tracks being adapted to elevate the sliding sash when moved forwardly or rearwardly; vertically pivoted hangers engaging said tracks; a plurality of sliding sashes supported on said hangers, whereby said sashes may be moved from said storage tracks onto said switch tracks; cam means on said sash hanger within said runway to automatically move said switch tracks and sliding sashes into flush alignment with said fixed sash and means on said top engaging said sash at the top and bottom edges for holding said sash in the flush position.

6. A convertible top having a runway therein; a fixed sash in said top; a plurality of storage tracks in said runway parallel with said sash; a plurality of vertically bowed switch tracks pivoted substantially in alignment with said fixed sash and adapted to register with said storage tracks, said bowed switch tracks being adapted to elevate the sliding sash when moved forwardly or rearwardly; vertically pivoted hangers engaging said tracks; a plurality of sliding sashes supported on said hangers, whereby said sashes may be moved from said storage tracks onto said switch tracks; cam means on said sash hangers within said runway to automatically move said switch tracks and sliding sashes into flush alignment with said fixed sash; and automatic means for placing said sash into and out of flush alignment with said fixed sash and means on said top engaging said sash at the top and bottom edges for holding said sash in the flush position.

In testimony whereof, we have hereunto set our hands at San Francisco, California, this 20th day of November, 1919.

CHESTER GILLIG.
LEO GILLIG.

Witnesses:
   BALDWIN VALE,
   A. J. HENRY.